United States Patent [19]

Lippert et al.

[11] 4,304,635

[45] Dec. 8, 1981

[54] FUEL ASSEMBLY FOR NUCLEAR BOILING-WATER REACTORS

[75] Inventors: Hans-Joachim Lippert, Erlangen; Alex Lodders, Celle, both of Fed. Rep. of Germany

[73] Assignee: Kraftwerk Union Aktiengesellschaft, Mülheim, Fed. Rep. of Germany

[21] Appl. No.: 44,081

[22] Filed: May 31, 1979

[30] Foreign Application Priority Data

Jun. 2, 1978 [DE] Fed. Rep. of Germany ....... 2824265

[51] Int. Cl.³ ................................................ G21C 3/30
[52] U.S. Cl. .................................................... 376/448
[58] Field of Search ......................... 176/76, 78, 79, 81

[56] References Cited

U.S. PATENT DOCUMENTS 3,878,042 4/1975 Curulla .................................. 176/81
4,119,489 10/1978 Itoh ....................................... 176/78

Primary Examiner—Donald P. Walsh
Attorney, Agent, or Firm—Herbert L. Lerner

[57] ABSTRACT

Fuel assembly for boiling water reactors formed of a cluster of fuel rods held by a head piece and a base, respectively, at opposite ends thereof and surrounded by a coolant-flow guiding casing with the aid of a fastening angle includes leaf springs carried by the fastening angle for mutually spacing the fuel assembly from and mutually clamping it with a multiplicity of other fuel assemblies combinable therewith into a reactor core, the leaf springs extending in axial direction of the fuel assembly and having both ends thereof in contact with the fastening angle, one of the ends being rigidly held by the fastening angle, and the other of the ends being slidingly held on the fastening angle.

7 Claims, 10 Drawing Figures

FUEL ASSEMBLY FOR NUCLEAR BOILING-WATER REACTORS

The invention relates to a fuel assembly for nuclear boiling-water reactors and, more particularly, to such a fuel assembly formed of a cluster of fuel rods held by a base and a head piece, respectively, and, with the aid of a fastening angle surrounded by a casing preferably of square cross section for guiding the coolant flow, the fastening angle being provided with leaf springs for mutual spacing and bracing of a multiplicity of such fuel assemblies forming a reactor core. Such fuel assemblies are traversed by cooling water upwardly from the bottom thereof, the cooling water transforming into steam in the process. For control purposes, conventional cruciform control rods are provided, which are generally introduced from below into the reactor core and into intermediate spaces located between groups of four adjacent fuel assemblies. Such four adjacent fuel assemblies form a so-called core cell.

During operation of the reactor, the structural material of the fuel assemblies is subjected to an extremely heavy neutron flux, which results in a permanent growth in length of the individual fuel assemblies. Since, on the one hand, the fuel assemblies in the various zones of the reactor core are subjected to a varying neutron flux and, on the other hand, new fuel assemblies are continuously exchanged for previously spent ones during fuel assembly exchanges, it is unavoidable that, after a given operating period of the reactor, fuel assemblies of varying length will be present adjacent one another in the core. This means, however, that the engagement or contact locations between the spring elements of adjacent fuel assemblies will be at different axial levels, so that the mutual holding forces become different and can thus lead to difficulties when inserting the control rods.

It is accordingly an object of the invention to provide a construction for the spring elements, which affords constant spring action even for varying mutual bracing locations, and therewith, permit no change in the clamping conditions of the fuel assemblies forming the core.

With the foregoing and other objects in view, there is provided, in accordance with the invention, a fuel assembly for boiling-water reactors formed of a cluster of fuel rods held by a head piece and a base, respectively, at opposite ends thereof and surrounded by a coolant-flow guiding casing with the aid of a fastening angle comprising leaf springs carried by the fastening angle for mutually spacing the fuel assembly from and mutually clamping it with a multiplicity of other fuel assemblies combinable therewith into a reactor core, the leaf springs extending in axial direction of the fuel assembly and having both ends thereof in contact with the fastening angle, one of the ends being rigidly held by the fastening angle, and the other of the ends being slidingly held on the fastening angle.

In accordance with another feature of the invention, the ends of the leaf springs are, respectively, upper and lower ends corresponding to the location of the head piece and the base with respect to the axial direction of the fuel assembly, the rigidly held end being the upper end, and the slidingly held end being the lower end.

In accordance with a further feature of the invention, the fuel assembly includes a fastening screw securing the fastening angle to the casing, and two of the leaf springs are located, respectively, on two sides forming a corner of the fuel element, the two leaf springs being secured in common at the upper ends thereof to the fastening angle by the fastening screw.

In accordance with an added feature of the invention two of the leaf springs are located, respectively, on two sides forming a corner of the fuel element, and means are provided for securing the two leaf springs individually at the upper ends thereof to the two sides, respectively.

In accordance with a concomitant feature of the invention, the leaf springs have a symmetrical, substantially arcuate shape bulging away from the fastening angle for attaining a spring characteristic that is maintained as constant as possible in axial direction.

Other features which are considered as characteristic for the invention are set forth in the appended claims.

Although the invention is illustrated and described herein as embodied in a fuel assembly for nuclear boiling-water reactors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figures 1, 2:
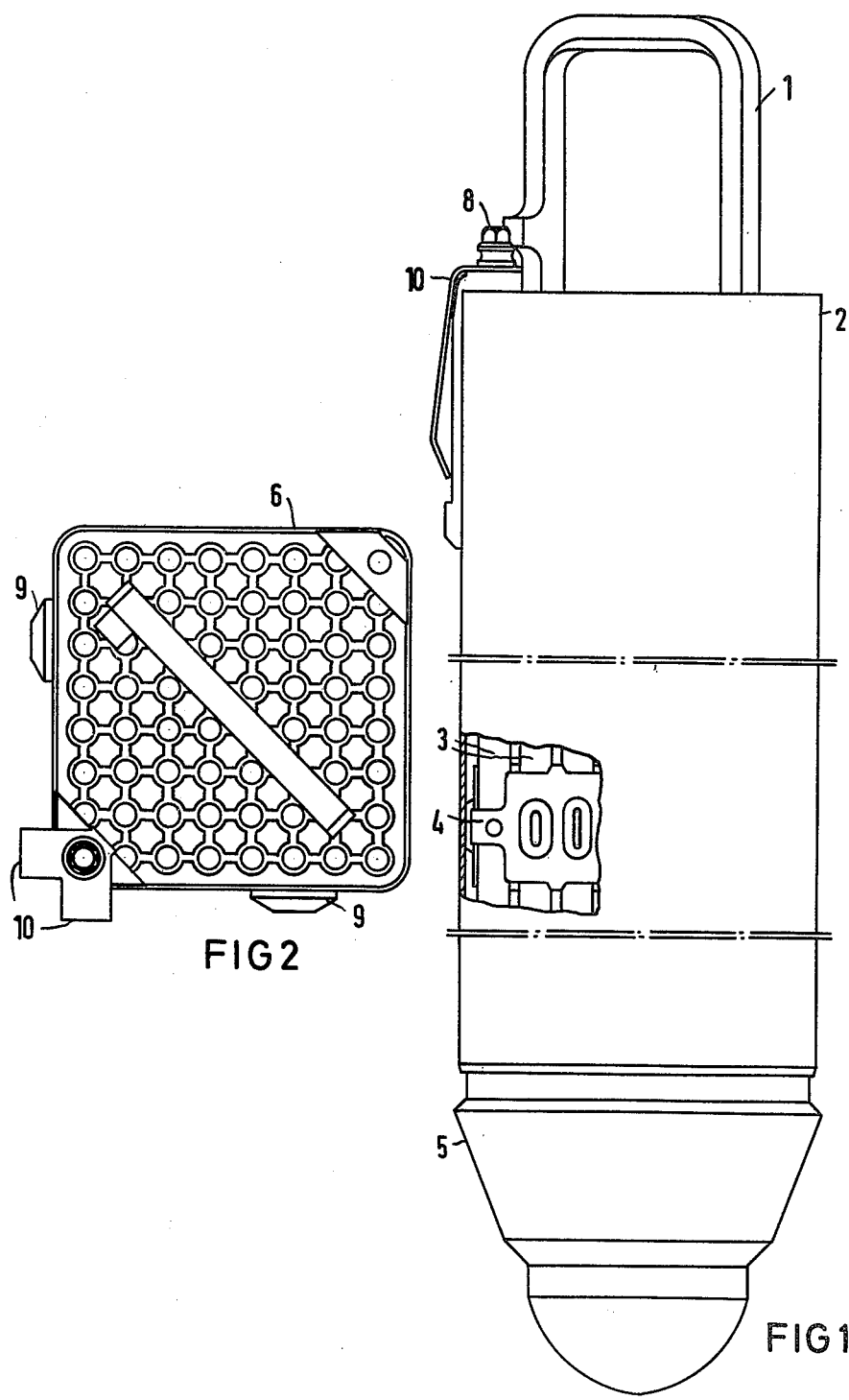
FIG. 1 is a longitudinal view, partly broken away and in section, of a conventional fuel assembly for a boiling water nuclear reactor.
FIG. 2 is a top plan view of FIG. 1.

Referring now to the drawing and first, particularly to FIGS. 1 and 2 thereof, there are shown in an elevational view and a top view, respectively, a boiling-water fuel assembly of conventional design. This assembly is formed of a multiplicity of fuel rods 3, which are disposed between a head piece 2 and a base 5. They are held at a mutual spacing by spacers 4. A fuel-assembly can or box 6 surrounds the entire fuel assembly and serves for guiding the coolant, which flows through this fuel assembly from the bottom to the top thereof. For handling the fuel assembly, as a whole, a lifting handle 1 is provided, which is connected to the head piece 2.

Figure 3:
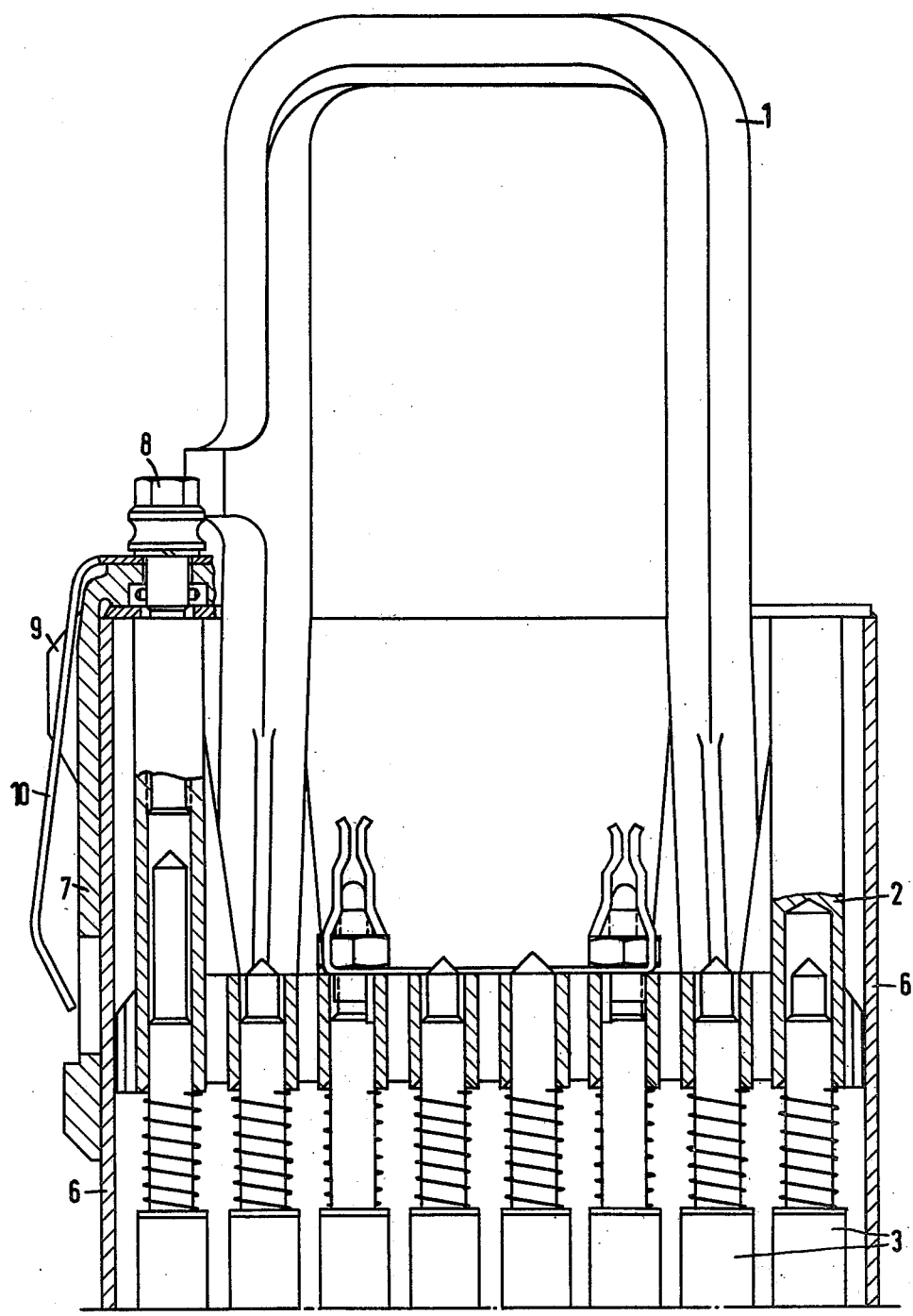
FIG. 3 is an enlarged fragmentary sectional view of FIG. 1 showing the head of the fuel assembly.
Figure 4:
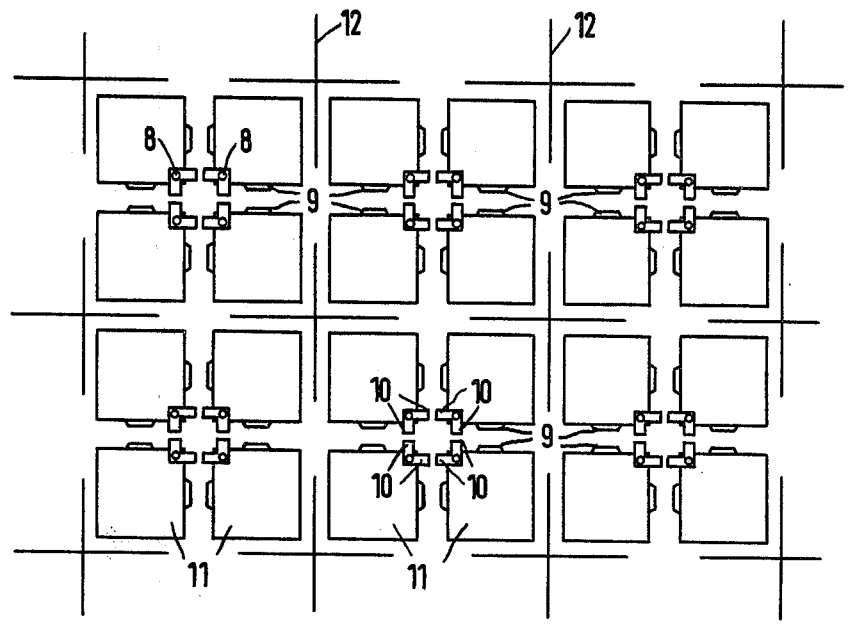
FIG. 4 is a fragmentary diagrammatic top plan view of a conventional nuclear core showing, on a reduced scale, component core cells each formed of four of the fuel assemblies of FIGS. 1 and 2.

In accordance with FIG. 4, groups of four fuel assemblies 11 of the type shown in FIG. 1 are arranged to form a core cell, cruciform control rods 12, shown diagrammatically in FIG. 4, being disposed between the individual core cells. Spring elements 10 are provided for mutually bracing or clamping the fuel assemblies 11 in the combined or compound structure of the reactor core (note also the enlarged view of the fuel assembly head in FIG. 3) and, in addition, solid or rigid contact bosses or knobs 9 are provided, both the spring element 10 and the boss 9 together with a fastening angle 7 and a fastening screw 8, and simultaneously also holding the fuel-element casing or can 6, being connected to the head piece 2 of the fuel assembly 11.

Figures 5, 6:
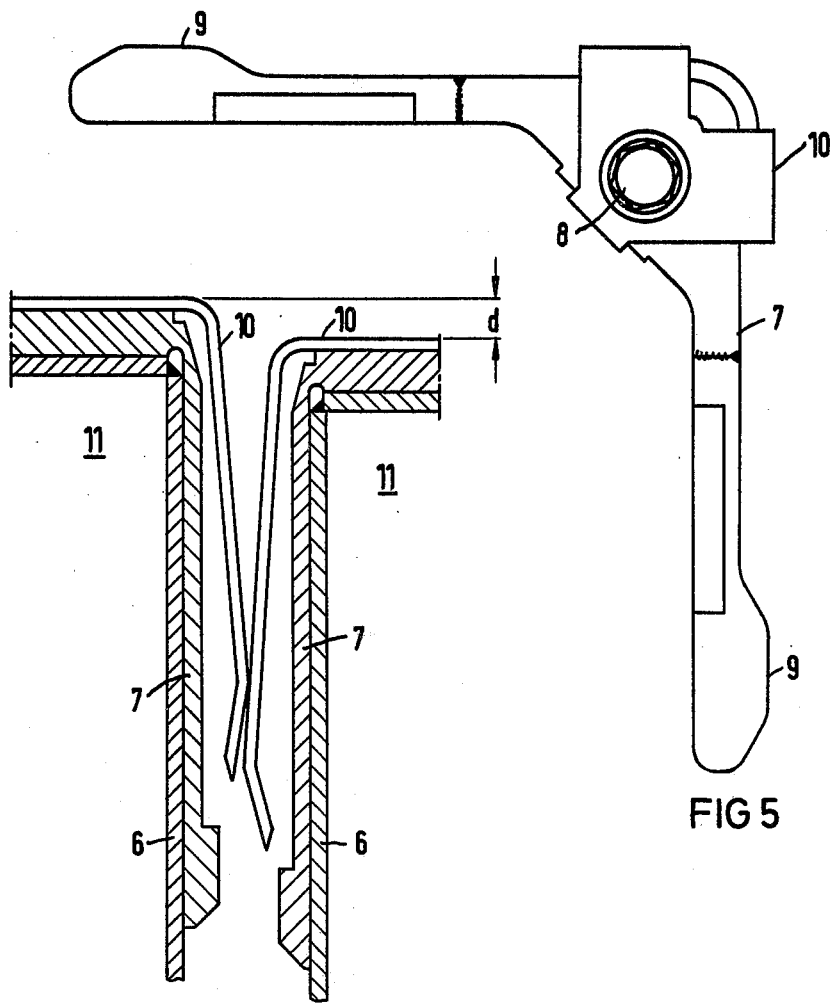
FIG. 5 is an enlarged fragmentary view of FIG. 2 showing the spring element thereof rotated through 180°.
FIG. 6 is a fragmentary view of FIG. 3 showing the spring element of the fuel assembly located alongside the spring element of an adjacent fuel assembly.

As can be seen from FIGS. 2, 4 and 5, a spring element 10 is disposed on the two sides of each fuel assembly located at one corner of the fuel assembly. This spring element 10 is formed of two leaf springs which are disposed at an angle to one another and are bent in accordance with FIG. 3. This construction of the spring elements 10 is also visible in the side view of FIG. 6 wherein the mutual spatial relationship of two fuel assemblies 11 is further represented, namely, at the left-hand side, a fuel assembly 11 that has already been in operation for a very long time and has accordingly grown in length and, at the right-hand side, a new fuel assembly 11. From the view of FIG. 6, it can be seen that the points of contact of the two spring elements 10 are shifted relative to one another and that, consequently, changes in the clamping or bracing forces are of necessity also produced (note also FIG. 4).

The aim of the novel construction of the spring elements 15 according to the invention, as shown in FIGS. 7 to 10 in several different embodiments, is to hold the hereinaforementioned clamping or bracing forces practically constant, regardless of the length of growth of the adjacent fuel assemblies. The constructions according to the invention involve individual flat springs 15 each of which have a separate fastening therefore at the fastening angle 7. The invention dispenses with a common fastening such as that of the conventional fastening screw 8, although it would also be possible to utilize such a common fastening with the new spring construction according to the invention.

Figure 7:
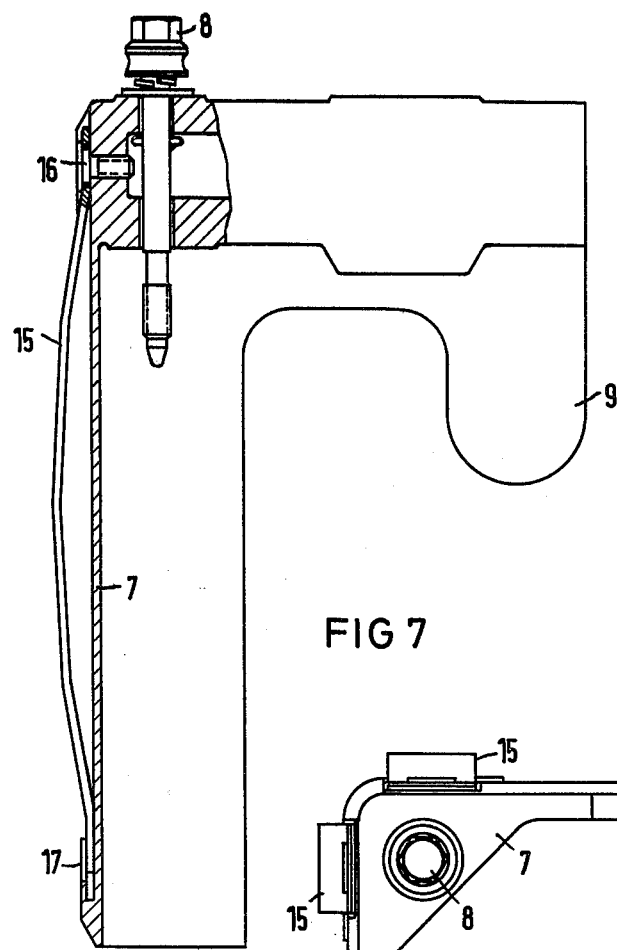
FIG. 7 is a enlarged fragmentary view of FIG. 3 showing a detail of the embodiment of the fuel assembly of a boiling-water nuclear reactor constructed in accordance with the invention.
Figure 8:
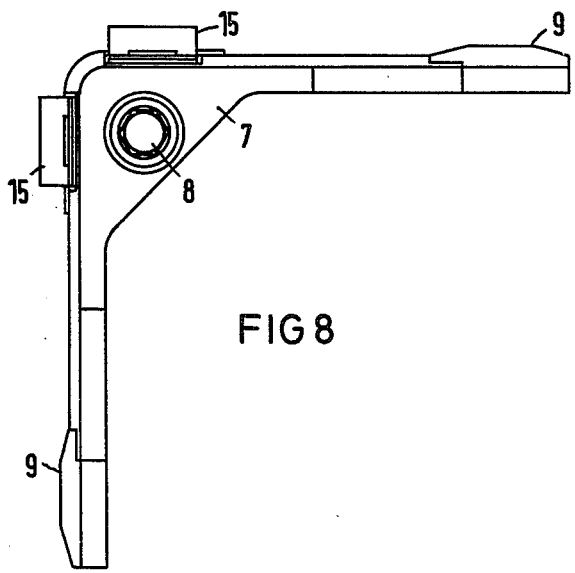
FIG. 8 is a top plan view of FIG. 7.

As viewed in axial direction of the fuel assembly i.e. in vertical direction in FIG. 7, the new spring element 15 according to the invention has a symmetrically bent shape, and both ends of the spring element 15 are in engagement with the fastening angle 7. The upper ends of the new spring element 15, as viewed in FIG. 7, is connected rigidly to the fastening angle 7, for example, by a screw 16; with the lower end thereof, however, the spring element 15 is slidingly received in a coulisse-like recess 17 formed in the fastening angle 7.

Figure 9:
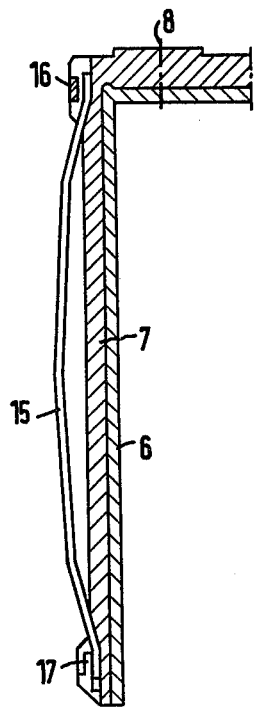
FIG. 9 is a view similar to that of FIG. 7 of another embodiment of the invention.

It would, of course, also be possible to provide a sliding support or bearing at the upper fastening point 16, such as shown in the embodiment of FIG. 9. Longitudinal displacement or shifting or the spring element 15 can be held within permissible limits by simple constructive measures. Due to the residual or inherent stress of the spring element 15 per se as well as due to the lateral stress or loading in the composite or combined structure of the reactor core (note FIG. 4), these spring elements 15 are reliably prevented from becoming detached or loosened from the fastening angle 7.

Figure 10:
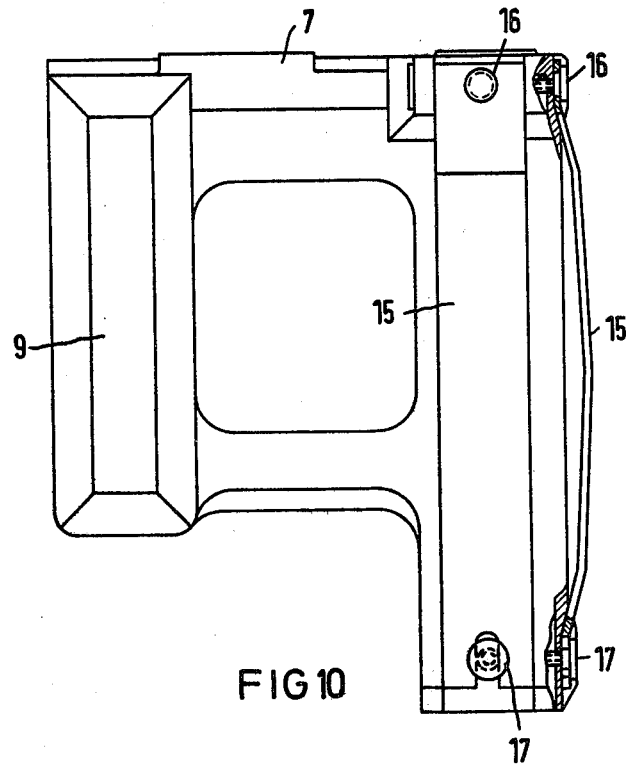
FIG. 10 is a side elevational view of FIG. 9, as seen from the left-hand side thereof, of a third embodiment of the invention.

A further embodiment of a fastening for the spring element 15 is shown in FIG. 10 wherein the upper fastening, as viewed in the figure, is again effected by means of a screw 16, while the sliding fastening 17 is achieved with a screw bolt and a corresponding slot formed in the lower end of the spring element 15.

Of course, many other means for providing the fastening are conceivable, for example, by special welds. The novel construction of the spring elements 15 according to the invention has an advantage over the heretofore known spring elements 10 in that the new spring elements 15 can neither be bent nor broken off during loading and unloading of the fuel assemblies. The shape as well as the mounting thereof further afford marked independence of the clamping or bracing forces from the length of growth of the fuel assemblies; in addition, it is possible thereby to adjust the spring characteristic accurately and also to increase the spring force over that of the heretofore known conventional constructions.

In addition, it should be noted that this construction of the spring elements 15 according to the invention is, of course, independent of the specific construction of the fastening angles 7 as well as of the spacer bosses or knobs 9 applied thereto. The spacer bosses or knobs 9 then have only the function of maintaining torsional distortion of all of the fuel assemblies 11 within limits, and furthermore, of protecting the minimal spacing between the adjacent fuel assemblies 11 as well as the spring elements 15 against over-load.

There are claimed:

1. Fuel assembly for boiling-water reactors formed of a cluster of fuel rods held by a head piece and a base, respectively, at opposite ends thereof and surrounded by a coolant-flow guiding casing with the aid of a fastening angle comprising leaf springs carried by the fastening angle for mutually spacing the fuel assembly from and mutually clamping it with a multiplicity of other fuel assemblies combinable therewith into a reactor core, said leaf springs extending in axial direction of the fuel assembly and having both ends thereof in contact with the fastening angle, one of said ends being rigidly held by the fastening angle, and means for slidingly holding the other of said holding ends on the fastening angle.

2. Fuel assembly according to claim 1 wherein said ends of said leaf springs are, respectively, upper and lower ends corresponding to the location of the head piece and the base with respect to the axial direction of the fuel assembly, said rigidly held end being said upper end, and said slidingly held end being said lower end.

3. Fuel assembly according to claim 2 including a fastening screw securing the fastening angle to the casing, and wherein two of said leaf springs are located, respectively, on two sides forming a corner of the fuel element, said two leaf springs being secured in common at said upper ends thereof to the fastening angle by the fastening screw.

4. Fuel assembly according to claim 2 wherein two of said leaf springs are located, respectively, on two sides forming a corner of the fuel element, and means for securing said two leaf springs individually at the upper ends thereof to said two sides, respectively.

5. Fuel assembly according to claim 1 wherein said leaf springs have a symmetrical, substantially arcuate shape bulging away from the fastening angle for attaining a spring characteristic that is maintained as constant as possible in axial direction.

6. Fuel assembly according to claim 1 wherein said holding means define a coulisse-like recess formed in the fastening angle, said other of said ends being slidingly received in said recess.

7. Fuel assembly according to claim 1 wherein said holding means define a slot formed in said other of said ends, and a pin secured to the fastening angle and projecting through said slot.

* * * * *